UNITED STATES PATENT OFFICE.

OSCAR HINSBERG, OF GENEVA, SWITZERLAND, ASSIGNOR TO THE FARB-WERKE, VORMALS MEISTER, LUCIUS & BRÜNING, OF HÖCHST-ON-THE-MAIN, GERMANY.

ANTIPYRIN MANDELATE AND METHOD OF MAKING SAME.

SPECIFICATION forming part of Letters Patent No. 569,415, dated October 13, 1896.

Application filed October 31, 1895. Serial No. 567,500. (Specimens.)

*To all whom it may concern:*

Be it known that I, OSCAR HINSBERG, doctor of philosophy, a citizen of the Empire of Germany, residing at Geneva, Switzerland, have invented certain new and useful Improvements in the Manufacture of Mandelate of Antipyrin, of which the following is a specification.

By the combination of antipyrin and phenylglycollic, sometimes called "mandelic acid" in molecular equivalents mandelate of antipyrin is formed.

I manufacture this substance in the following manner: One hundred and eighty-eight parts by weight of antipyrin and one hundred and fifty-two parts by weight of phenylglycollic are dissolved together in alcohol, benzene, or other solvent and the solvent is evaporated. A colorless syrup is thus obtained, which on standing for some time solidifies to a hard crystalline mass. The same compound is obtained by mixing antipyrin and phenylglycollic, melting the mixture on a water-bath, and letting it cool down.

Mandelate of antipyrin melts at 52° centigrade. It is intended for a remedy for whooping-cough and administered in doses of 0.1 to 0.5 grams. It is soluble in nearly all solvents and separates out from them as an oil which gradually solidifies to an opaque white powder. Solvents do not decompose it, but acids and alkalies easily separate it into its component parts.

Having thus described my invention, I claim as new and desire to secure by Letters Patent—

1. The process herein described of producing mandelate of antipyrin, which consists in the reaction of antipyrin with phenylglycollic acid, substantially as set forth.

2. As a new article of manufacture, mandelate of antipyrin, being a solid substance melting at 52°, soluble in nearly all solvents separating out as an oil from its solutions which gradually solidifies to an opaque white powder, not decomposable by neutral solvents, easily decomposable by alkalies and acids into its component parts.

In testimony that I claim the foregoing as my invention I have signed my name in presence of two subscribing witnesses.

OSCAR HINSBERG.

Witnesses:
    BENJ. H. RIDGELY,
    OTTO MAY.